United States Patent [19]
Harding

[11] Patent Number: 6,084,712
[45] Date of Patent: Jul. 4, 2000

[54] THREE DIMENSIONAL IMAGING USING A REFRACTIVE OPTIC DESIGN

[75] Inventor: Kevin G. Harding, Niskuyana, N.Y.

[73] Assignee: Dynamic Measurement and Inspection,LLC, Toledo, Ohio

[21] Appl. No.: 09/185,768

[22] Filed: Nov. 3, 1998

[51] Int. Cl.[7] ............................ G02B 27/10; G01B 11/14; G01B 11/24

[52] U.S. Cl. ............................ 359/618; 359/619; 356/374; 356/376

[58] Field of Search ............................ 359/618, 619; 356/374, 376

[56] References Cited

U.S. PATENT DOCUMENTS

| | | | |
|---|---|---|---|
| 4,794,550 | 12/1988 | Greivenkamp, Jr. | 702/167 |
| 4,988,886 | 1/1991 | Palum et al. | 250/559.07 |
| 5,062,705 | 11/1991 | Sato et al. | 356/124 |
| 5,069,549 | 12/1991 | Harding | 356/376 |
| 5,080,477 | 1/1992 | Adachi | 351/212 |
| 5,189,493 | 2/1993 | Harding | 356/376 |
| 5,289,264 | 2/1994 | Steinbichler | 356/376 |
| 5,307,152 | 4/1994 | Boehlein et al. | 356/376 |
| 5,460,758 | 10/1995 | Langer et al. | 264/401 |
| 5,610,719 | 3/1997 | Allen et al. | 356/374 |
| 5,635,025 | 6/1997 | Bieman et al. | 356/374 |
| 5,834,767 | 11/1998 | Hasegawa et al. | 250/237 |
| 5,835,218 | 11/1998 | Harding | 356/354 |
| 5,847,832 | 12/1998 | Liskow et al. | 356/376 |

Primary Examiner—Georgia Epps
Assistant Examiner—Michael A Lucas
Attorney, Agent, or Firm—Harness, Dickey & Pierce, P.L.C.

[57] ABSTRACT

A method and apparatus for gathering full-field three dimensional data for a surface by directing light through a master grating and a projection lens onto a surface, viewing the light from the surface though an imaging lens, a plurality of splitting lenses, and a submaster grating, creating a plurality of moire fringes, and examining said plurality of moire fringe patterns to determine full-field three dimensional data.

20 Claims, 4 Drawing Sheets

THREE DIMENSIONAL IMAGING USING A REFRACTIVE OPTIC DESIGN

BACKGROUND OF THE INVENTION

The present invention relates generally to the field of measurement and more specifically the present invention relates to a method and apparatus for gathering full field three dimensional (3D) data using phase shift information generated by moire images.

There are a number of optical methods employed today to extract full-field 3D data from a camera image. Stereo techniques utilizing the image disparity between two cameras have been thoroughly investigated in the academic arena. Although the data can be acquired in one camera frame cycle, establishing correspondence for every pixel in the image has proven to be difficult and computationally expensive. To simplify the processing, structured lighting has been incorporated. A few commercial systems known in the art employ multiple laser light stripes imaged by a stereo camera viewing system to generate full field 3D data. The advantages of such a system include being able to acquire data in one camera frame cycle and elimination of some of the calculation complexity of stereo through the use of laser light stripes.

An alternate approach to extracting the full-field three-dimensional data from a camera image has been through the use of moire contouring. Moire contouring is a full-field, non-contact measurement technique. A moire pattern provides a contour map of the imaged surface analogous to the way a topographic map delineates the contour of the land. The generation of images through moire interferometry is done using the interference of light caused by a set of gratings. Two gratings of known pitch are superimposed upon one another. The first creates a shadow or image of parallel lines of light projected on the object. The second is placed in the imaging arrangement used to view the part and superimposed on the image of the first grating seen on the surface, forming a moire fringe pattern.

The moire fringe pattern comprises a plurality of dark fringes with the orientation and distance between the dark fringes being directly related to the surface profile. The resolution and sensitivity of the moire pattern is adjusted by varying the line spacing of the gratings and/or the angles of illumination and viewing on the part. A single moire image can be analyzed to produce a three-dimensional output with depth resolution typically 1/10 of the fringe contour interval. That is, subfringe interpolation is of limited accuracy using only one image. This is especially true if the image surface has texture which can distort the moire fringe information.

The phase shift measurement of moire images is a very effective approach for gathering a full-field 3D data. Through the phase shifting of moire fringes, many problems associated with extracting information from a single moire image can be eliminated. By obtaining a minimum of three sets of fringes, each with a different phase position of the fringe pattern relative to the part surface, it is possible to uniquely calculate the depth information at every point in the moire image. The phase change causes a modulation of light at each image pixel. The resulting sinusoidal light modulations at each image pixel is used to determine the depth information. The depth calculation is invariant to the reflectivity of the surface as long as the light modulation is within the range of the camera's sensitivity (neither dark or saturated).

The limitations of using this approach are that data is gathered over multiple images as the moire pattern is phase shifted. During the gathering of this data the subject surface must remain stationary during a minimum of three different video exposures of the fringe pattern. In the past, to phase shift the moire pattern one of the gratings or the surface itself had to be shifted for each additional phase, potentially causing disruptions in the subject surface and grating position. These disruptions can cause motion blurring and the loss of surface position information. For many applications it would be advantageous to be able to gather the data with just one camera exposure and still be able to obtain the benefits afforded by the phase shifting technique. Therefore it would be desirable to take all three moire phase images simultaneously, providing a snapshot of the part contour.

Previous methods utilizing only one snapshot to obtain a part contour have been reported using color separation and multiple cameras. This color separation approach employs a three color grating viewed through a black and white submaster by a color video camera. The problem with this approach is that good separation of the colors is needed to obtain clear moire patterns at each of the colors. Color separation techniques also have the disadvantage of being sensitive to part coloration. For a bare metal part, the part coloration would typically not be an extreme limitation, but has been found to limit the measurement resolution due to the need to balance the signals from the three color channels. Three separate video cameras, viewing the part either through a common primary lens, each with a separate submaster grating, or with three independent viewing systems adjacent to each other is also a possible means of obtaining three phases of a moire image pattern at one time. With three video cameras, there is a need to synchronize and calibrate the cameras with respect to each other. The challenges of such video balancing often has suggested the use of cooled, very low noise video cameras, which are available. Perhaps the greater challenge is actually making all three moire patterns look the same with a fixed phase relationship between them. Stability requirements for any high resolution moire measurement for this system have been shown to be in the nanometer region, requiring great precision from the mechanical system supporting the cameras.

Accordingly, a need exists for a simple moire phase measurement system immune from mechanical instability and noise problems with the ability to generate 3D topographical information in a single snapshot.

SUMMARY OF THE INVENTION

The present invention provides a method and apparatus to gather full field 3D data utilizing the phase shifting of moire patterns without the need to shift grating or surface position to acquire multiple images. A refractive element system simultaneously produces multiple moire images of the same surface scene, allowing a single snapshot to acquire all the needed phase information to provide full field 3D data. The system is adjusted so that each of the simultaneous moire images provides a different moire phase. From these simultaneous images, accurate subfringe information can be extracted using standard phase calculating techniques. An added advantage of this optical design is that the images can have a stereo disparity which is a function of the lensing system. This stereo disparity can be used to eliminate the two pi ambiguity problem that plagues other phase calculating techniques.

Further objects, features, and advantages of the invention will become apparent from a consideration of the following description and the appended claims when taken in connection with the accompanying drawings.

DETAILED DESCRIPTION OF THE PREFERRED EMBODIMENT

Figure 1:
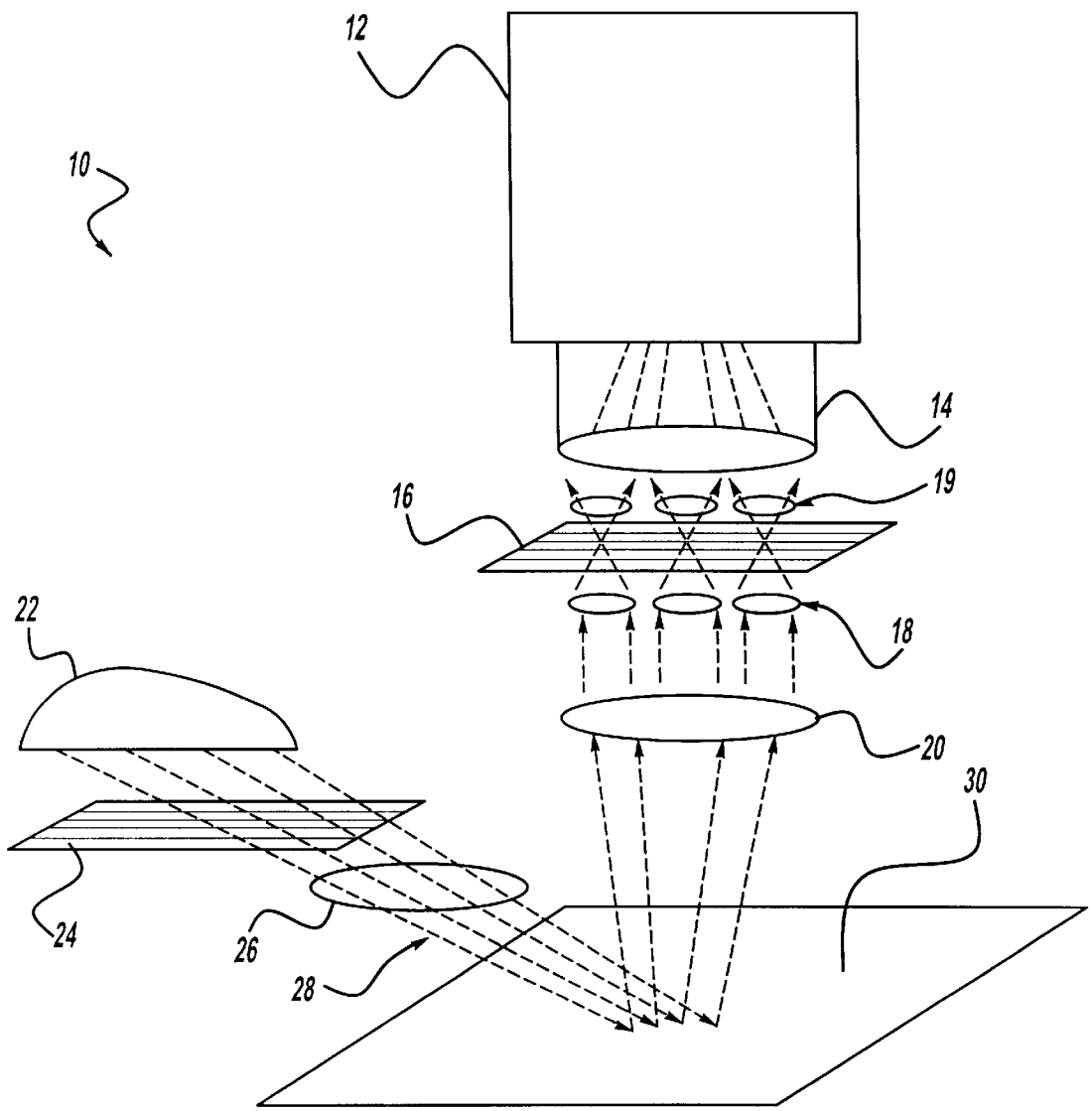
FIG. 1 is a diagrammatic view of the present invention.
Figure 2:
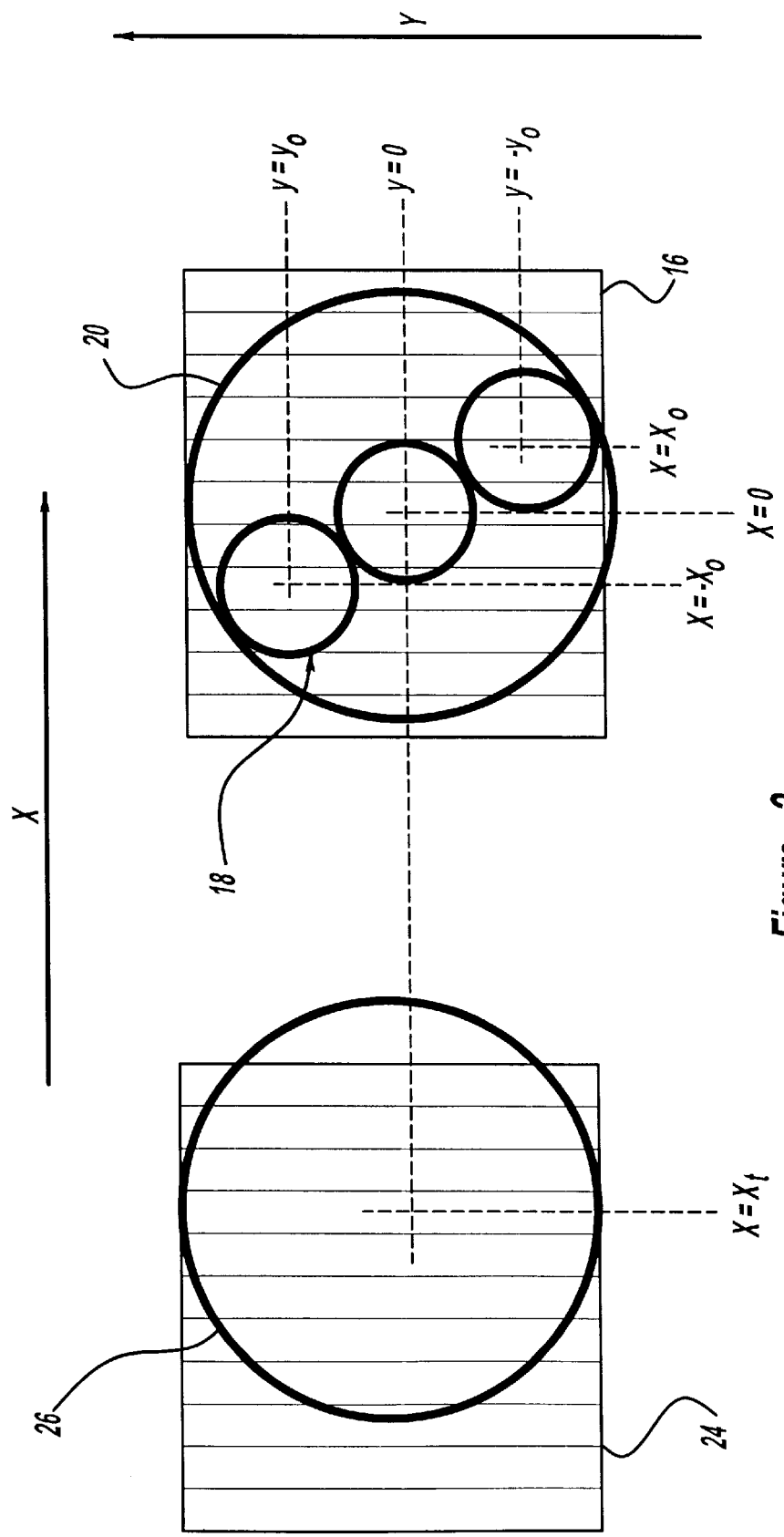
FIG. 2 is a top view of the present invention in the xy plane.

Referring to FIGS. 1 and 2, the layout for the moire imaging system of the present invention, including refractive optics 18 for image splitting, is shown. A light source 22 projects light rays 28 through a master grating 24, which partially obstructs the projected light rays 28 in the pattern of the grating, creating line patterns. The light source 22 in the preferred embodiment is a diffuse light source but in alternate embodiments may comprise a coherent light source. The partially obstructed light rays exit the master grating 24 and are transmitted through a projection lens 26 where the light rays 28 are focused onto a surface 30 (usually a workpiece).

Figure 4:
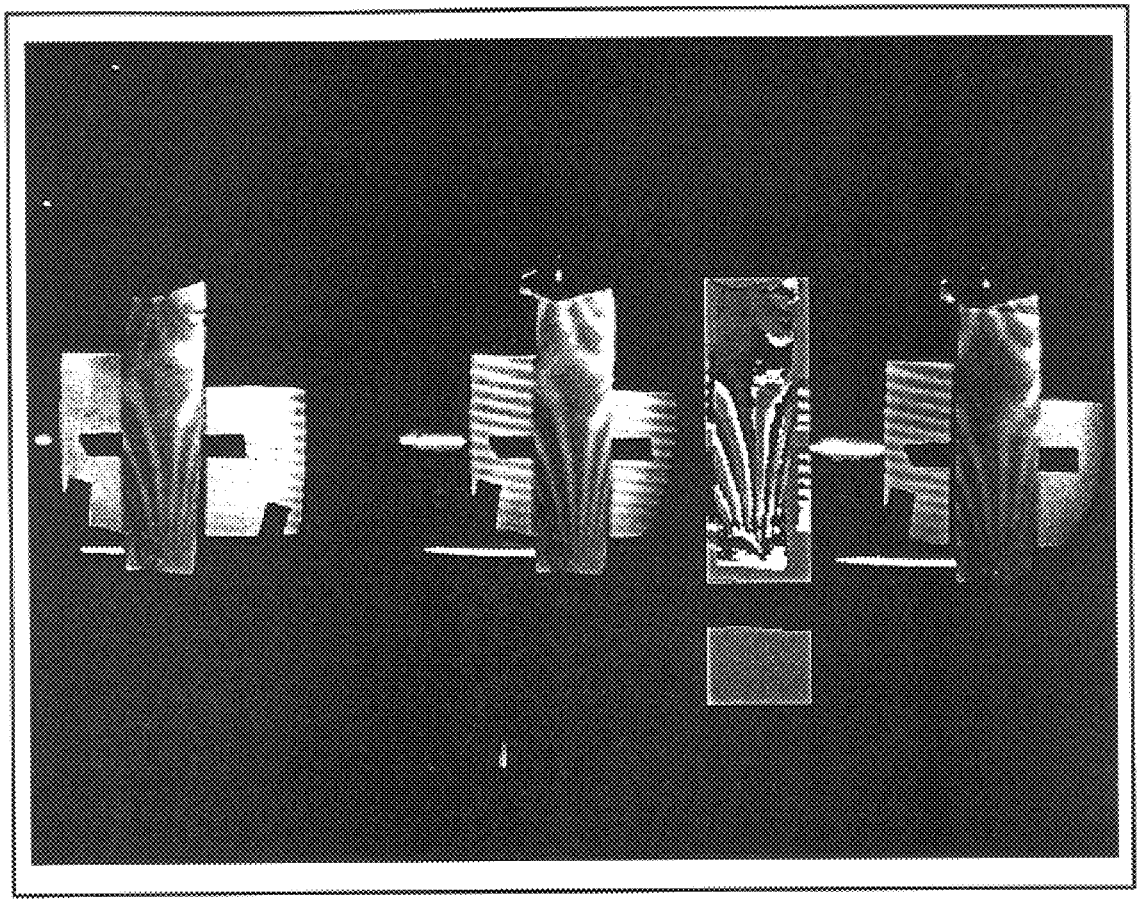
FIGS. 4 is an example of moire fringe patterns generated by the present invention.

On the imaging side of the system, as seen in FIG. 1, the surface 30 is placed at approximately one focal length away from the first imaging lens 20. Thus, the image created by the lens 20 is formed at infinity. The image splitting lenses, shown generally as 18, reform the image at infinity onto the secondary or submaster grating 16. The secondary grating 16 is one focal length away from the splitting lenses 18. Alternatively, for objects distant compared to the focal length of lenses 18, the image distance is very near the focal length of lens 18, and in such cases lens 20 can be deleted. Each of the splitting lenses 18 produces a separate moire image at the submaster grating 16. Thus, with three splitting lenses, three separate moire images are formed centered on each of the three splitting lenses' 18 optical axes. The offset between the optical axis of the first imaging lens 20 and the optical axis of each of the splitting lenses 18 produces an image offset on the submaster grating 16. This offset is used to establish a phase difference between the three moire images and remove image overlapping. A second set of lenses 19 immediately behind the submaster grating 16 and in line with splitting lenses 18, collects the light from the multiple images. This second set of lenses 19 is not essential but improves the overall performance of the system. This second set of lenses 19 are one focal length from the splitting lenses 18 and serve to reverse the process by collimating the light into field lens 14 to present all the images to a single camera 12. This presentation of all the moire images to a single camera eliminates the need to move gratings or the examined surface, simplifying the surface analysis. A single snap-shot can be used to collect the generated multiple moire fringe patterns. FIG. 4 is an example of moire fringe patterns generated by the present invention.

The nature of this refractive imaging technique also provides a stereo disparity between the position of the three split images created by the splitting lenses 18, as the vertical distance of the workpiece changes. This disparity can be used as a coarse measure to eliminate the two pi ambiguity in the moire phase calculation. The two pi ambiguity is a phenomena produced by interference based imaging methods whose intensity follows a sine wave. That is, as the surface of the part moves away or toward the observer, the intensity seen at a point will become brighter or darker in a manner that a linear movement of the part generates a sine wave change in the light seen at that point. As sine waves are a repeating function, the intensity of the light pattern will go from dark to light back to dark continuously. The interval of a sine wave is a change of angle or phase angle, in this case two pi. The present invention is able to measure and track the sine waves and phase changes to predict the distance between the object and the point at which the object is being viewed.

In the present invention, the moire pattern itself establishes the correspondence when making the stereo calculation. That is, if the phase difference between two of the moire images is 180 degrees, then each maximum in one image should correspond to a minimum in the other moire image.

Figure 3:
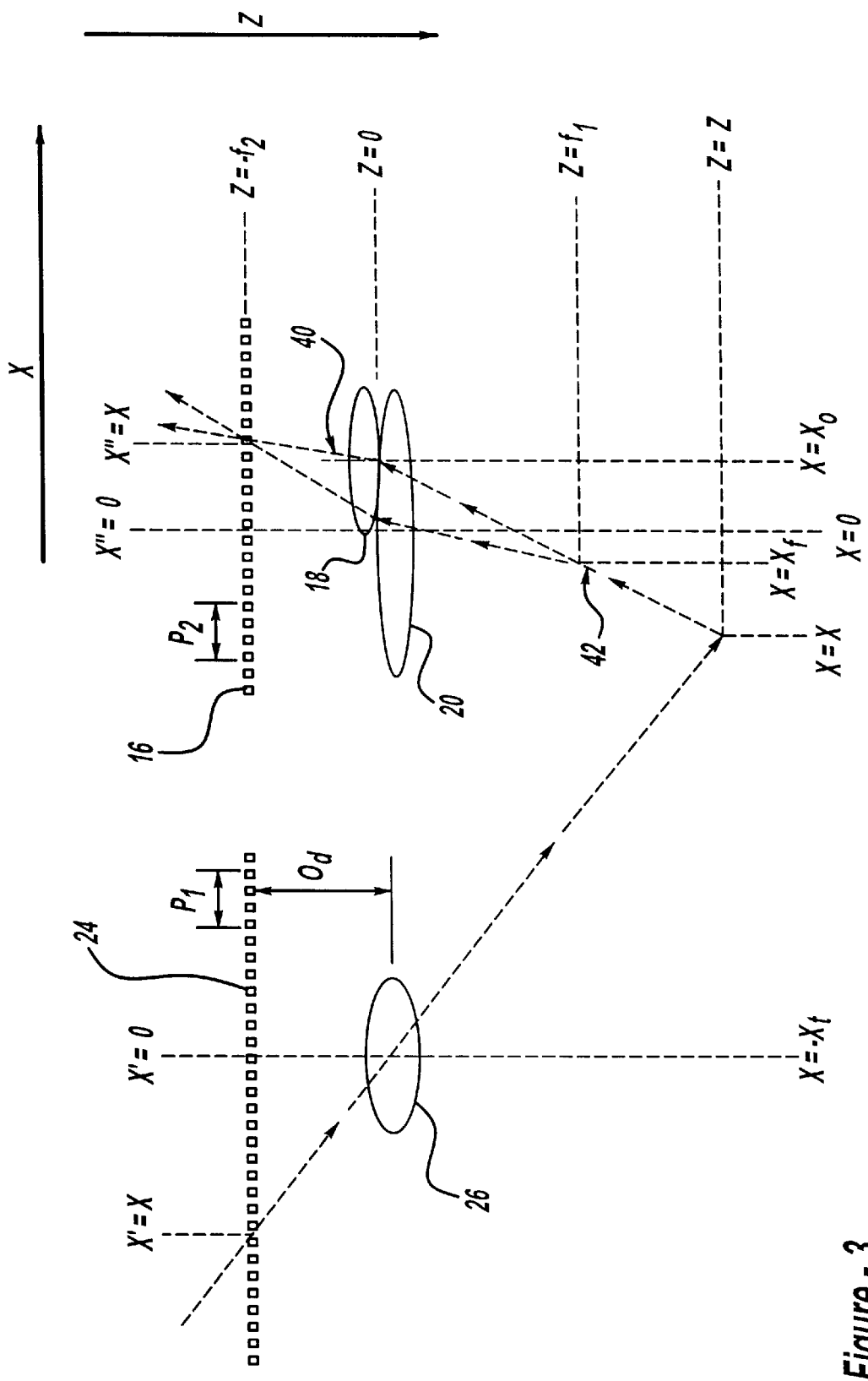
FIG. 3 is a diagrammatic view of the present invention in the xz plane.

The mathematics for the system shown in FIGS. 1 and 2 can be best understood if we set-up all the lenses so their principal axes are all in the same plane (xz plane), as shown in FIG. 3. For simplicity, only one of the splitting lenses 18 is shown in FIG. 3, although in the preferred embodiment three splitting lenses are used. The only change will be the value of $x_0$, the offset from the optical axis of the first imaging lens.

The relationship between the object space and image space for the projection system can be established by assuming equal angles on both sides of the projection lenses Thus:

$$-x'/O_d = (x-x_t)/z \qquad (1)$$

The relationship on the imaging side is more complex. To simplify this relationship, it is assumed that the z separation between the first imaging lens 20 and the spitting lens 18 is small compared to the standoff of the imaging lens 20 from the part surface. For the imaging system, the secondary or submaster grating 16 is located at the focal plane $(z=f_2)$ of the image splitting lens 18. To establish where the image is formed, it is easiest to use the intersection of the ray 40 going through the center of the spitting lens 18 with the submaster grating 16. If the object distance is at the focal plane (position $x=x_f, z=f_1$) of the first imaging lens 20, then the ray 42 going from that object point to the first imaging lens 20 will be parallel to ray 40. Thus, $$-x_f/f_1 = (x''-x_0)f_2 \qquad (2)$$

Equation 2 defines the relationship between the image position and an object point at the focal plane of the first imaging lens. This image position will be the same for any point along the light ray line from position x=x, z=z to the surface of the first imaging lens. Thus, the following ratio holds true between the object position (x) and $x_f$.

$$(x_f-x_0)/f_1 = -(x-x_0)/z \qquad (3)$$

Equations 1–3 can be used to define the relationship between the master grating 24 and its reimaging onto the submaster grating 16.

To calculate the moire effects, we assume that the intensity patterns of the gratings are sinusoidal functions. For the master grating 24 on the projection side:

$$I_1 = \sin(x'2\pi/p_1) \qquad (4)$$

For the submaster grating 16 on the imaging side:

$$I_2 = \sin(x''2\pi/p_2) \qquad (5)$$

To calculate the moire beat phase, we need to determine the equation of the image of the master grating 24 that is superimposed on the submaster grating 16. This is accomplished by combining Equations 1–4 to produce:

$$I_1 = \sin[(x''/f_2 - x_0/f_2 + x_t/z)O_d 2\pi/p_1] \quad (6)$$

Calculating the beat phase (BP) between Equation 5 and 6 yields:

$$BP = [x''/f_2 + x_0(1/f_1 - 1/f_2 - 1/z) + x_t/z]O_d 2\pi/p_1 - [x''2\pi/p_2] \quad (7)$$

To eliminate that phase dependence on x", we assume that the system is configured so that $p_1/O_d$ is equal to $p_2/f_2$. Then the beat phase becomes:

$$BP = [x_0(1/f_1 - 1/f_2 - /z) + x_t/z]O_d 2\pi/p_1 \quad (8)$$

The first term in the bracketed section of Equation 8 represents the phase shift due to the position shift ($x_0$) of the splitting lens 18. As can be seen on the equation, this phase shift can be adjusted for each of the splitting lenses 18 so there is a phase difference between the moire images created by each of the splitting lenses 18. Assuming the workpiece is a depth position of $z = f_1$, then the phase shift created by the positional shift (PS) is:

$$PS = -(x_0/f_2)O_d(2\pi/p_1) = -x_0 2\pi/p_2 \quad (9)$$

Unfortunately, as can be seen in Equation 8, this shift due to $x_0$ varies as a function of z. This dependence on z is an undesirable effect that needs to be minimized by keeping $x_0$ as small as possible and still producing the desired phase shift between the moire images.

Using three or more moire images, each shifted in phase from the other, allows the unique calculation of the phase at each point in the image. Before calculating the phase, the stereo disparity between the three images must be taken into account. If a phase difference of 180 degrees is used, then the stereo correspondence between images can be established by the fact that every moire intensity peak in one image will correspond to a valley in the other image, or whatever calculated intensity change per the phase difference set between the images.

The last term in the bracketed section of Equation 8 represents the phase shift due to a change in the z position of the workpiece. From the second term, the contour interval of the system can be calculated. That is, the change in z required to produce a $2\pi$ phase shift. The contour interval (CI) is approximately equal to:

$$CI = (p_1 z_0^2)/(O_d x_t) \quad (10)$$

(this is just the grating period times the magnification of the grating onto the part, divided by the sum of the tangents of the angles onto the part.)

The stereo disparity between images from two of the split lenses 18 can be used as a course positional calculation to eliminate the two pi ambiguity in the phase measurement. Minimizing $x_0$ to keep the z dependence of the phase shift between images to a minimum also eliminates the stereo disparity that can be used for a course positional measurement. If we arrange the lenses as shown in FIG. 2, then we can have a small $x_0$ and still have the stereo disparity which is provided by the shift of the lenses in the y direction, $y_0$. Note, this geometry also permits a small $x_0$ while allowing for larger splitting lenses for better light collection.

To determine the stereo disparity equation in the y direction, we need to establish the relationship in the y direction between the object and image positions on the imaging side of the system. The equations for this are the same as for x (Equations 2 and 3) except that all x's need to be replaced by y's. From these equations:

$$y'' = [-y/z - y_0(1/f_1 - 1/f_2 - 1/z)]f_2 \quad (11)$$

Using Equation 11, we calculate the disparity between the image of the splitting lens at $y = y_0$ and the splitting lenses at $y = -y_0$. Assuming the null position is at $z = f_1$ (i.e. the primary viewing lens and splitting lens are thin lenses with no separation), then the stereo disparity in the imaging plane ($\delta y''$) as a function of a small change in z ($\delta z$) can be expressed as:

$$\delta y'' = 2y_0(f_2/f_1^2)\delta z \quad (12)$$

Thus, Equation 12 can be used to calculate the stereo disparity in the y direction between the images created by the two outside image splitting lenses.

To provide a perspective for the above equations, we will present two example systems. The first system has a small contour interval and the second system is a modification of the first to provide a large contour interval.

Example 1 will use a 10 lines per mm grating on both the projection and imaging side. Thus the grating pitch is 0.1 mm. A 50 mm focal length projection lens will be used at a magnification of 5 to 1 so that the object distance is 60 mm and the imaging distance is 300 mm. On the imaging side, the first imaging lens will have a 300 mm focal length to form the object image at infinity and the image splitting lenses will have a 60 mm focal length to reconstruct the image from infinity. The separation between the projection and imaging lens will be 100 mm which provides an approximately 20 degree triangulation angle. The separation distance for the image splitting lenses will be 20 mm. If the workpiece viewing width is 100 mm then each of the three images at the secondary grating will be 20 mm. The total imaging width for the three images formed at the submaster grating is then 60 mm. If we assume we image the moire pattern of the secondary lens with a 640×480 pixel camera, then the pixel size for the image will be approximately one line pair or 0.1 mm. Thus, only the moire pattern will appear in the image with the grating lines having a high enough frequency to not be resolved by the camera. In terms of the parameters from the last section:

$p_1 = p_2 = 0.1$ mm
$O_d = f_2 = 60$ mm
$f_1 = 300$ mm
$x_1 = 100$ mm
$y_0 = 20$ mm

The two items we wish to calculate from the above parameters are the contour interval for the system and the stereo disparity as a function of the contour interval. Using Equation 10, the contour interval for this system is 1.5 mm. Using the three phase shifted images published practice of phase shifting can resolve the phase to 8 bits or 1/256 of the contour interval, then resolution is approximately 6 microns. To find what the stereo disparity is for a $\delta z$ change of one contour interval, we use Equation 12. The stereo disparity is calculated to be 0.04 mm in the image plane where the submaster grating is located. Since the pixel resolution is 0.1 mm, the shift due to the stereo effect is 2/5 of a pixel. An advantage of this Example 1 system is that this stereo shift is small enough that it could be ignored when making the phase calculation. A disadvantage is that the stereo shift is also to small to resolve the two pi ambiguity.

Example 2 is a modification of Example 1 but for the Example 2 system, the contour interval is increased to allow the stereo shift to provide a coarse measurement that can be used to resolve the two pi ambiguity. For example 2, the grating will be changed to 2 lines per mm with a pitch of 0.25 mm ($p_1=p_2=0.25$ mm). Also, the triangulation angle will be reduced by 50% so that $x_t=50$ mm. For this system, the grating pitch is larger than the pixel size of 0.1 mm. Special means must be used to assure that the grating lines are not imaged by the camera. For example, both gratings might be moved together as the image is acquired to provide motion blurring of the grating lines while providing a static moire pattern, or the grating lines might just be put out of focus, relying on the much coarser moire pattern to still be in focus.

For Example 2, from Equation 10, the contour interval is 15 mm, and thus the resolution is 60 microns. Using Equation 12, the stereo disparity for a depth change of one contour interval becomes 0.4 mm or 4 pixels. This means that as a distance to the object changes by one contour interval, a point on the part relative to the optical axis of the splitting lenses on either side of center will displace by 0.4 mm. As the distances to the part increases, the primary lens is not really imaging to infinity anymore, leading to a very small perspective variation as seen by the splitting lenses. This image shift is enough to provide the coarse measurement needed to resolve the two pi ambiguity. It is also enough to provide the coarse measurement when making the phase calculations. That is, local image registration is required before the phase can be calculated.

It is to be understood that the invention is not limited to the exact construction illustrated and described above, but that various changes and modifications may be made without departing from the spirit and scope of the invention as defined in the following claims.

What is claimed is:

1. A method for gathering full-field three dimensional data for a surface comprising:

generating light;

directing said light through a master grating and a projection lens onto said surface;

viewing said light from said surface though an imaging lens, a plurality of splitting lenses, and a submaster grating, wherein a plurality of moire fringe patterns are generated and create a sinusoidal light modulation;

examining said plurality of moire fringe patterns to determine said full-field three dimensional data.

2. The method of claim 1, wherein said projection lens and said imaging lens are multi-element lenses.

3. The method of claim 1, further comprising the step of digitizing said plurality of moire fringe patterns with a single camera.

4. The method of claim 3, further comprising the step of storing said digitized plurality of moire fringe patterns.

5. The method of claim 1, wherein the step of examining said plurality of moire fringe patterns comprises determining phase shift measurements for said plurality of moire fringe patterns.

6. The method of claim 1, wherein the step of examining said plurality of moire fringe patterns comprises examining said sinusoidal light modulation to determine depth information.

7. The method of claim 1, wherein the step of examining said plurality of moire fringe patterns comprises:

determining image position and relationship between the master grating and its reimaging onto the submaster grating;

calculating moire effects;

calculating a phase shift of said moire fringe patterns; and correlating said phase shift to a contour interval.

8. The method of claim 7, further comprising the step of visually displaying said contour interval.

9. The method of claim 7, wherein said step of calculating a phase shift of said moire images comprises using the equation:

$$(\text{phaseshift}) PS = -(x_0/f_2) O_d (2\pi/p_1) = -x_0 2\pi/p_2.$$

10. The method of claim 7, further comprising the step of calculating a contour interval using the equation:

$$(\text{contourinterval}) CI = (p_1 z_0^2)/(O_d x_t).$$

11. The method of claim 1, further comprising the step of examining said sinusoidal light modulation created by said plurality of moire fringe patterns.

12. The method of claim 1, wherein said plurality of splitting lenses comprises three lenses.

13. A method of determining the topography of a surface comprising:

generating a plurality of interference patterns on said surface;

phase shifting said plurality of interference patterns;

viewing said plurality of interference patterns simultaneously; and examining said viewed plurality of interference patterns to determine said surface topography.

14. The method of claim 13, wherein said interference patterns are generated by a plurality of gratings.

15. The method of claim 13, wherein said interference patterns are a plurality of moire fringe sets.

16. An apparatus for determining the topography of a surface comprising:

a light source generating a light beam;

a master grating optically coupled to said light source;

a projection lens optically coupled to said master grating, wherein said projection lens directs said light beam at a surface;

an imaging lens optically coupled to said surface;

a plurality of splitting lenses optically coupled to said imaging lens;

a submaster grating optically coupled to said plurality of splitting lenses; and a viewing system which views said surface through said imaging lens, said plurality of splitting lenses, and said submaster grating, wherein a plurality of phase shifted diffraction patterns are viewed.

17. The apparatus of claim 16, wherein said plurality of phase shifted diffraction patterns are moire fringes.

18. The apparatus of claim 16, wherein said plurality of splitting lenses are configured to generate a predetermined phase shift in said diffraction patterns.

19. The apparatus of claim 16, wherein said plurality of splitting lenses comprises three lenses.

20. The apparatus of claim 16, wherein said viewing system is a single camera which collects said plurality of phase shifted diffraction patterns and stereo images simultaneously.

* * * * *